United States Patent [19]

Chatelain et al.

[11] Patent Number: 4,868,255

[45] Date of Patent: Sep. 19, 1989

[54] PROCESS FOR PREPARING VINYL CHLORIDE POLYMERS BY MASS POLYMERIZATION WITH SPHERICAL VESSEL

[75] Inventors: Jean Chatelain, Beaumesnil; Yves LeGrand, Saint-Priest, both of France

[73] Assignee: Atochem, Paris, France

[21] Appl. No.: 140,142

[22] Filed: Dec. 30, 1987

[30] Foreign Application Priority Data

Jan. 20, 1987 [FR] France ................. 87 00586

[51] Int. Cl.$^4$ ............................... C08F 2/02
[52] U.S. Cl. ...................... 526/65; 526/88; 526/344.1
[58] Field of Search .............. 526/65, 88, 344.1

[56] References Cited

U.S. PATENT DOCUMENTS

| | | | |
|---|---|---|---|
| 3,546,192 | 12/1970 | Borsini | 526/344.1 |
| 3,558,584 | 1/1971 | Thomas | 526/344.1 |
| 3,687,917 | 8/1972 | Wisseroth | 526/344.1 |
| 3,726,648 | 4/1973 | Weber | 526/344.1 |
| 4,740,571 | 4/1988 | Nagano | 526/201 |

*Primary Examiner*—Christopher Henderson
*Attorney, Agent, or Firm*—Sigalos, Levine & Montgomery

[57] ABSTRACT

A process for preparing polymers and copolymers based on vinyl chloride by mass polymerization of a monomer composition based on vinyl chloride, comprising carrying out at least part of the polymerization reaction in a polymerization zone defined by an essentially spherical wall by effecting in the said polymerization zone a controlled and regulated circulation of the polymerization reaction mixture by means of a rotated blade-type turbine assembly, where the said blades pass by in the vicinity of the said wall over 10% to 60% of its surface, the reaction mixture being caused by the centrifugal force of said rotated blade-type turbine assembly to perform an at least partially ascending movement over at least part of the spherical wall and falling back, essentially under the action of gravity in the central part of the spherical polymerization zone, thus ensuring intensive mixing without dead space.

6 Claims, 2 Drawing Sheets

PROCESS FOR PREPARING VINYL CHLORIDE POLYMERS BY MASS POLYMERIZATION WITH SPHERICAL VESSEL

BACKGROUND OF THE INVENTION

The present invention pertains to a process for preparing polymers and copolymers based on vinyl chloride by mass polymerization of a monomer composition based on vinyl chloride. It also pertains to the polymers and the copolymers based on vinyl chloride prepared according to the said process.

The mass polymerization of a monomer composition based on vinyl chloride first progresses in the liquid monomer composition. Due to the insolubility of the polymer or copolymer in the monomer composition, the reaction product will separate in the solid state during the polymerization in the form of particles which are maintained in suspension in the liquid monomer composition by subjecting the reaction mixture to agitation. If the polymer or copolymer content; on a weight basis, in the reaction mixture reaches a value on the order of magnitude of 15%, its consistency becomes comparable to that of agitated curdled milk. This consistency increases until the monomer composition will no longer form a continuous liquid phase, which occurs when the polymer or copolymer content; on a weight basis, in the reaction mixture reaches a value on the order of magnitude of 25%, a value beyond which the reaction mixture is in the powdered state. The reaction mixture is maintained in this state by continued agitation, which prevents the reaction product from lumping together, until the polymer or the copolymer is obtained in the powdered form at the end of the polymerization, after degassing of the nonreacted monomer composition.

The term "monomer composition based on vinyl chloride"; or "monomer composition" for short, is defined in the present description as vinyl chloride alone or mixed with at least one other monomer which is copolymerizable with vinyl chloride. The said monomer composition based on vinyl chloride contains at least 70 wt. % vinyl chloride. Especially vinyl acetate and the low-molecular-weight olefins, e.g., ethylene and propylene, can be mentioned as monomers which are copolymerizable with vinyl chloride.

The mass polymerization of a monomer composition based on vinyl chloride is generally carried out in the presence of at least one polymerization initiator which is soluble in organic solvents and generates free radicals, e.g., an organic peroxide or an azo compound.

When the intended rate of conversion of the monomer composition is reached, the polymer obtained is subjected to a degassing treatment, which is carried out while agitating and is intended to separate the nonreacted monomer composition from the polymers or copolymers.

The powdered polymer or copolymer obtained after degassing of the nonreacted monomer composition is brought to atmospheric pressure generally with an inert gas such as nitrogen or water vapor before it is exposed to the open air, which is generally followed by a screening operation.

The screening operation, which is carried out industrially as a continuous process, serves to separate the noble product, defined as the product passing through a screen with a given mesh size, selected as a function of the grain size distribution of the polymer or copolymer and the intended use, and the coarse product, which essentially consists of resin particle agglomerates, is of a lower commercial value and is defined as the oversize on the said screen.

It was previously proposed that the preparation of polymers and copolymers based on vinyl chloride by mass polymerization or mass copolymerization should be carried out in two phases according to a process consisting of the polymerization or copolymerization operations, ensuring high-speed stirring of the reaction mixture during the first phase, until the conversion rate of the monomer composition reaches a value on the order of magnitude of 7% to 15%, preferably between 8% and 12%, after which the stirring speed during the second phase of the reaction is reduced to the lowest possible value, however, still remaining sufficient to ensure good heat exchange within the reaction mixture, and this speed is maintained until the end of the reaction. According to these techniques, the two phases, the first of which is carried out with high-speed turbulizing agitation and the second with slow agitation, are carried out either in a single reactor or in different reactors, in which case the said phases, the first of which is now called the prepolymerization phase and the second is called the final polymerization phase, are carried out in appropriate devices called prepolymerizers and polymerizers, respectively. According to these techniques, the second phase is carried out in a reaction mixture formed either solely by the monomer composition/polymer from the first polymerization phase or by the said monomer composition/polymer and by a supplementary monomer composition based on vinyl chloride, which is identical to or different from the composition used during the first phase, as well as one or several polymerization initiators.

These processes and their variants were described in detail in French Patents and Certificates of Addition Nos. 1,357,736, 83,377, 83,383, 83,714; 1,382,072, 84,958, 84,965, 84,966, 85,672, 89,025; 1,436,744, 87,620, 87,623, 87,625, 87, 626; 1,450,464; No. 1,574,734, and No. 1,605,175. Improvements of the polymerizers used to carry out the said processes were described in French Patent No. 73 05537, published as No. 2,218,350 and No. 75 32124, published as No. 2,328,722, as well as in French Patent Application No. 85 05429, published as No. 2,580,192.

These processes and their variants make it possible to prepare, in a reproducible manner, polymers and copolymers based on vinyl chloride which after screening possess interesting characteristics in terms of high apparent density, mean particle diameters adjustable to need and the low weight percentage of fine particles.

However, the preparation of polymers and copolymers based on vinyl chloride according to these processes requires the use of two agitators of different types, one for high-speed turbulizing agitation during the first phase and another for slow agitation during the second phase.

SUMMARY OF THE INVENTION

While making it possible to prepare, in a reproducible manner, polymers and copolymers based on vinyl chloride which possess the above-mentioned interesting characteristics, the process according to the present invention requires the use of only one agitator from the beginning to the end of the polymerization reaction.

According to the process of the present invention, at least part of the polymerization reaction is carried out in a polymerization zone defined by an essentially spherical wall by bringing about controlled and regulated circulation of the reaction mixture in the said polymerization zone by means of a rotated blade-type turbine assembly, wherein the said blades pass by in the vicinity of the said wall over 10% to 60% of its surface, the reaction mixture being caused by the centrifugal force to perform, over at least part of the spherical wall, an at least partially ascending movement and falling back, essentially under the action of gravity in the central part of the spherical zone, thus ensuring intensive mixing without dead spaces.

DETAILED DESCRIPTION

The entire polymerization reaction is preferably carried out in the polymerization zone defined by an essentially spherical wall.

In fact, the inventors have found that by carrying out the polymerization reaction under the conditions of the process according to the present invention, it is possible to obtain, in a reproducible manner and using a single agitator, polymers and copolymers based on vinyl chloride which after screening possess interesting characteristics in terms of high apparent density, mean particle diameters adjustable to need and a low weight percentage of fine particles, despite the fact that the reaction mixture successively has four different states from the beginning to the end of the polymerization reaction; liquid state, suspension of solid particles in a liquid, pasty state, and powdered state, and its consistency changes considerably.

According to the present invention, it is possible to vary the speed of rotation of the blade-type turbine assembly as a function of the state of the reaction mixture and its consistency, the desired mean particle diameter of the polymer or copolymer or any other parameter of the process or the quality of the resins to be prepared. The speed of rotation of the blade-type turbine assembly is generally reduced between the beginning and the end of the polymerization reaction to a value lower than one-third the initial value and to as low as one-fourth the initial value.

Also according to the present invention, the polymerization reaction may be started in the polymerization zone defined by an essentially spherical wall with a very small initial volume of reaction mixture, which makes it possible to carry out polymerization operations in which part of the monomer or monomers and/or part of the polymerization initiator or polymerization initiators and/or at least part of any other additive can be introduced into the said polymerization zone during the polymerization or the degassing of the polymer obtained.

According to a first variant o the process according to the present invention, the polymerization reaction is carried out in two steps, which are carried out in different devices, carrying out a prepolymerization operation with a monomer composition based on vinyl chloride in the first step and a final polymerization operation in the second step, the said first step being carried out in the polymerization zone defined by the essentially spherical wall.

According to an embodiment of the first variant of the process according to the present invention, the prepolymerization operation is carried out in the polymerization zone defined by the essentially spherical wall until the degree of conversion of the monomer composition reaches 3% to 15%, a supplementary monomer composition based on vinyl chloride, which is identical to or different from that used during the first step, is added to the reaction mixture if desired, after which the final polymerization operation is carried out with the reaction mixture thus formed while stirring slowly. According to this embodiment, the final polymerization step can be carried out, e.g., in a polymerizer of the conventional type as described, e.g., in French Patent No. 1,382,072 and its above-referenced Certificates of Addition; in French Patent No. 73 05537, published as Nos. 2,218,350 and No. 75 32124, published as No. 2,328,722 and in French Patent No. 85 05429, published as No. 2,580,192.

According to a second variant of the process according to the present invention, the polymerization reaction is carried out in two steps, which are carried out in different devices, carrying out a prepolymerization operation in the first step with a monomer composition based on vinyl chloride and a final polymerization operation in the second step, the second step being carried out in the polymerization zone defined by an essentially spherical wall.

According to an embodiment of the second variant of the process according to the present invention, the prepolymerization operation is carried out with highly turbulizing agitation until the degree of conversion of the monomer composition reaches 3% to 15%, a supplementary monomer composition based on vinyl chloride, which is identical to or different from that used during the first step, is added to the reaction mixture if desired, after which the final polymerization operation is carried out with the reaction mixture thus formed in the polymerization zone defined by an essentially spherical wall. According to this embodiment, the prepolymerization step can be carried out, e.g., in a prepolymerizer of the convention type as described, e.g., in French Patent No. 1,382,072.

The inventors have also found that if the process according to the present invention is employed either by carrying out the entire polymerization reaction in the polymerization zone defined by an essentially spherical wall or by carrying out the polymerization reaction in two steps, which are performed in different devices, the second step being carried out in the polymerization zone defined by an essentially spherical wall, the duration of the degassing treatment is noticeably reduced under otherwise identical conditions.

In practice, the space between the blades and the wall of the spherical polymerization zone of the reactor, in which the process according to the present invention is carried out, is advantageously between 2 mm and 50 mm. The length of the blades of the turbine assembly is such that the distance between their tips and the lowest point of the spherical wall, measured vertically, is at least equal to one-tenth the diameter of the sphere, in which case the diameter of the circle described by their tips during rotation is at least equal; with regard to the play, to three-fifths the diameter of the sphere, which means that the said blades pass by in the vicinity of the spherical wall over at least 10% of the surface. The blades may pass by in the vicinity of the sherical wall such that they reach an equatorial plane, in which case the diameter of the circle described by their tips during rotation is equal; without regard to the play, to the diameter of the sphere. The blades may also extend slightly beyond the equatorial plane perpendicular to the axis of rotation. The turbine assembly generally comprises one to six blades, especially three blades, which are preferably disposed regularly around the axis of rotation and are advantageously profiled so as to facilitate intensive mixing.

In addition, the reactor may be, but does not need to be, equipped with an additional scraping system consisting of one or several rotated members in the part of the spherical polymerization zone not occupied by the turbine assembly. The shape of the industrial reactions which are suitable for use for the process according to the present invention is not necessarily that of a complete integral sphere. According to the present invention, the only important thing is that the polymerization zone be defined by an essentially spherical wall. However, the spherical shape of the reactor may be interrupted by various tubes, pipe connections or openings. Thus, for the convenience of use and especially cleaning, the reactor may comprise openings of sufficient size to permit access to the inside and, e.g., the entry of a person in the case of large reactors. The reactor may be, e.g., of the type described in French Patent No. 1 22425, published as No. 2,517,313.

The descriptions illustrating the embodiments of the process according to the present invention will be described below in an illustrative rather than a limitative manner with reference to FIGS. 1a through 1d of sheet 1 of the appended drawings, and a reactor suitable for use for carrying out the process according to the present invention will be described with reference to FIGS. 2 and 3 of the drawings.

Figure 1A:
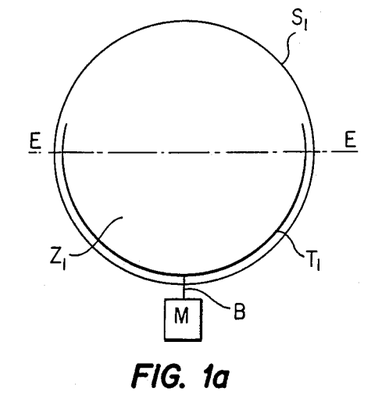
FIGS. 1a, 1b, 1c, and 1d are schematic illustrations of zones in reactors that are suitable for use in the method of the present invention.

FIG. 1a shows a closed polymerization zone $Z_1$ defined by a spherical wall $S_1$. A turbine assembly $T_1$, provided with blades disposed regularly around a pivot B essentially located in the bottom point of the sphere, is mounted to rotate around the said pivot. A motor M drives the turbine $T_1$. In this example, the tips of the blades of the turbine assembly $T_1$ extend beyond the equatorial plane (line E—E) perpendicular to the axis of rotation (which is essentially vertical in the case of FIG. 1a) and pass by in the vicinity of the internal spherical wall over 60% of the surface of the sphere.

Figure 1B:
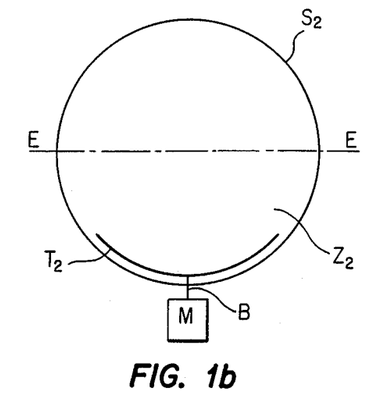

FIG. 1b shows a closed polymerization zone $Z_2$ defined by a spherical wall $S_2$. A turbine assembly $T_1$, mounted to rotate around a pivot B, is driven by a motor M in the same manner as shown in FIG. 1a. In this example, the tips of the blades of the turbine assembly $T_2$ describe a circle whose diameter is at least equal; without regard to the play, to three-fifths the diameter of the sphere $S_2$.

Figure 1C:
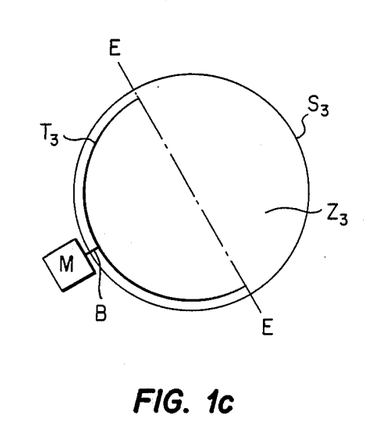

FIG. 1c shows a diagram analogous to FIGS. 1a an 1b showing a polymerization zone $Z_3$ defined by a sphere $S_3$. The turbine assembly $T_3$, driven by the motor M, rotates around a pivot B which is shifted relative to the bottom point of the sphere. In this example, the axis of rotation of the turbine $T_3$ is not vertical. The equatorial plane (line E—E), perpendicular to this axis of rotation, is oblique. The tips of the blades of the turbine $T_3$ describe a circle whose diameter is equal; without regard to the play, to that of the sphere $S_3$.

Figure 1D:
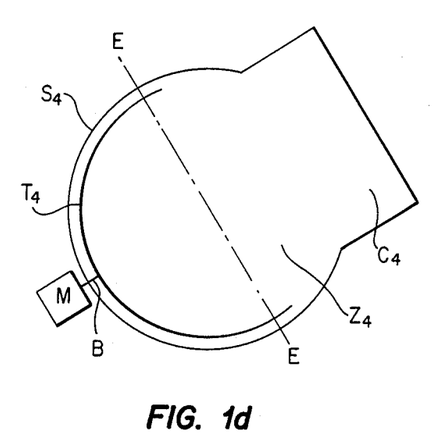

FIG. 1d illustrates an essentially spherical polymerization zone $Z_4$ defined by a spherical wall $S_4$ and by a cylindrical extension $C_4$ which can serve as a screen or permits access to zone $Z_4$. The turbine $T_4$, which is driven by the motor M to rotate around a pivot B, is mounted in the same manner as in FIG. 1c.

Figure 2:
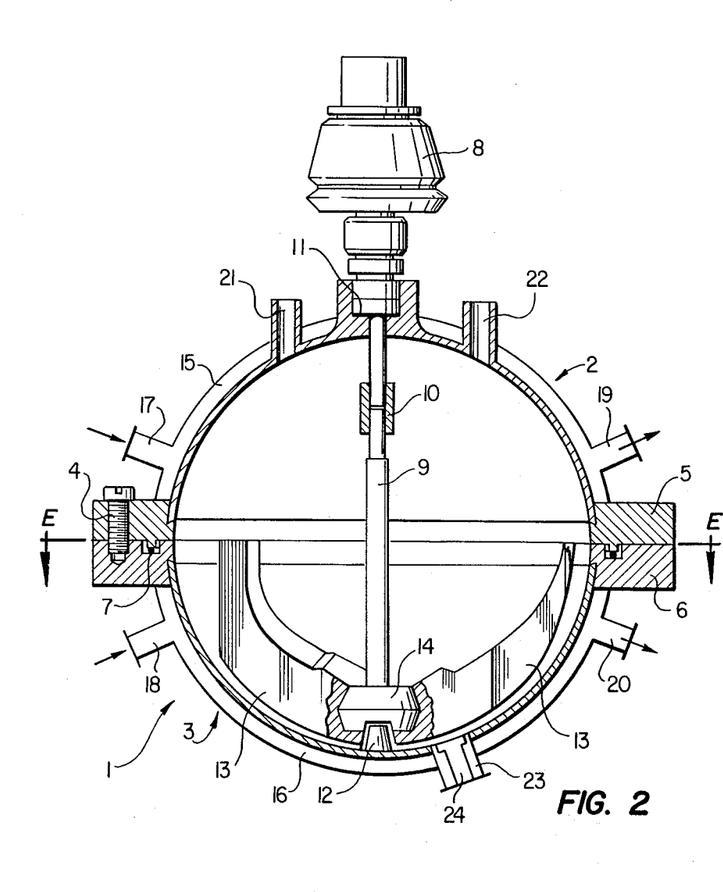
FIG. 2 is a sectional view along the vertical axis of a reactor suitable for use in the method of the present invention.

The spherical reactor 1 shown in FIG. 2 comprises two hemispheres, an upper hemisphere 2 and a lower hemisphere 3. The hemispheres 2 and 3 are assembled and maintained by bolts 4 distributed in a diametrical plane over the respective flanges 5 and 6 and the hemispheres 2 and 3. A synthetic rubber gasket 7 ensures tight sealing between the two hemispheres.

The reactor 1 is equipped with a magnetically operated drive assembly 8 driving a shaft 9 disposed vertically along one diameter of the reactor 1, with insertion of a coupling 10. The shaft is sealed by a polytetrafluoroethylene packing 11. A turbine assembly carried b a projection 12 mounted in the bottom point of the lower hemisphere 3 comprises three blades 13 connected to the base 14 which is rigidly attached to the shaft 9. The turbine assembly is mounted so that the blades pass by in the vicinity of the internal wall of the lower hemisphere 3 and extend to the level of the equatorial plane (line E—E) of the reactor 1.

The reactor 1 is surrounded by two jackets 15 and 16 which are fastened to the hemispheres 2 and 3, respectively, in which a heat exchange fluid circulates, entering via the tubes 17 and 18 and leaving via the tubes 19 and 20.

In its upper part, the reactor 1 comprises a tube 21 for feeding in the monomers, the polymerization initiators and any other additive used, as well as a tube 22 for discharging the nonreacted monomer composition. In its lower part, the reactor 1 comprises a tube 23 controlled by a valve 24 for discharging the polymer.

Any polymerization initiator which can be used to prepare polymers and copolymers based on vinyl chloride by mass polymerization and which generally form free radicals is suitable for use in the process according to the present invention, such as organic peroxides, e.g., lauroyl peroxide, acetyl cyclohexanesulfonyl peroxide, isobutyroyl peroxide, dichloroacetyl peroxide, trichloroacetyl peroxide; peroxydicarbonates, such as ethyl peroxydicarbonate, ethyl hexyl peroxydicarbonate, isopropyl peroxydicarbonate, isobutyl peroxydicarbonate, cetyl peroxydicarbonate, cyclohexyl peroxydicarbonate, tert.-butyl cyclohexyl peroxydicarbonate; tert.-butyl perneodecanoate, cumyl perneodecanoate; tert.-butyl permethoxyacetate; tert.-butyl perethoxyacetate; tert.-butyl perphenoxy-2-propionate; 2,4,4-trimethyl pentyl perphenoxy-2-acetate; and azo compounds such as 2,2'-azo-bis-(2,4-dimethylvaleronitrile). The polymerization initiator or polymerization initiators are used, in general, in amounts of 0.001 wt. % to 0.006 wt. %; expressed as active oxygen, relative to the total weight of the monomer composition used.

The polymerization temperature is, in general, between 10° C. and 100° C., preferably between 30° C. and 75° C.

The invention will be further described in connection with the following examples which are set forth for purposes of illustration only.

Examples 1 through 4, 7 through 9, 11 through 15, 17, 18, 20, 21, as well as 23 through 26, are examples according to the present invention.

Examples 5, 6, 10, 16, 19, and 22 are given as comparative examples.

The "noble" product is defined as the product passing through a screen with a mesh size of 630, μm.

The viscosity index of the polymers and copolymers based on vinyl chloride is determined according to the international standard ISO 174.

The fine particles are represented by the product passing through a screen with a mesh size of 40 μm, and the weight percentage of the fine particles is stated relative to the noble product.

The vinyl acetate-crotonic acid copolymer used in the examples consists of 94 wt. % vinyl acetate and 6 wt. % crotonic acid and has an intrinsic viscosity of 0.187, determined according to the method described in French Patent No. 77 27429, published as No. 2,402,669.

EXAMPLE 1

Figure 3:
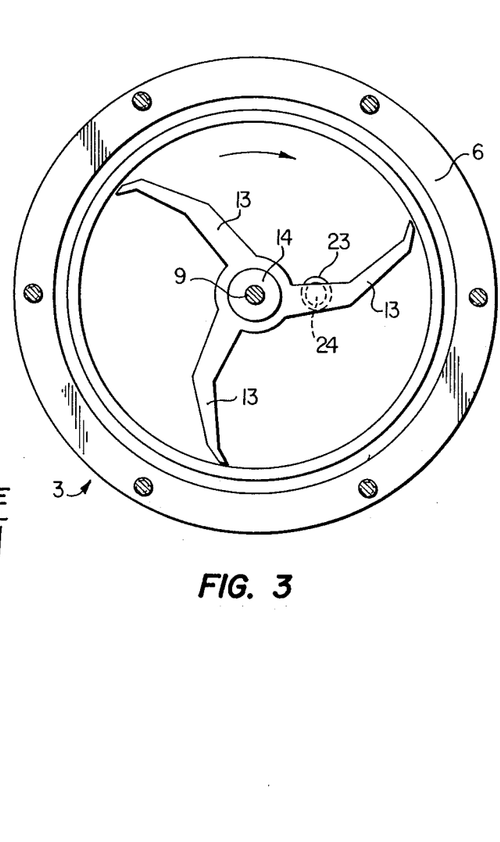
FIG. 3 is a cross-sectional view of the reactor of FIG. 2 taken along line E—E.

After evacuation, 860 g of vinyl chloride are charged into a spherical reactor as described and represented in FIGS. 2 and 3, which said reactor has a volume of 2.5 liters, is made from stainless steel and is equipped with a double jacket, where the distance between the blades of the agitator and the wall of the spherical polymerization zone is between 2 and 5 mm, and the device is purged by removing 50 g of gaseous vinyl chloride. 0.519 g of ethyl hexyl peroxydicarbonate; corresponding to 0.024 g of active oxygen, and 0.080 g of vinyl acetate-crotonic acid copolymer are also charged in. The stirring speed is set at 500 rpm.

The temperature of the reaction mixture is brought to 69° C. within 30 minutes, which corresponds to a relative pressure of 11.5 bars.

After polymerization for 15 minutes at 69° C., the temperature of the reaction mixture is lowered to 60° C. in ten minutes, which corresponds to a relative pressure of 10 bars, and the stirring speed is reduced to 150 rpm.

After polymerization for three hours at 60° C. and release of the nonreacted gaseous vinyl chloride, 520 g of polyvinyl chloride are collected.

EXAMPLE 2

After evacuation, 860 g of vinyl chloride are charged into the spherical reactor used in Example 1, and the device is purged by releasing 50 g of gaseous vinyl chloride. 0.216 g of ethyl hexyl peroxydicarbonate corresponding to 0.010 g of active oxygen, 0.373 g of lauroyl peroxide corresponding to 0.015 g of active oxygen, and 0.020 g of vinyl acetate-crotonic acid copolymer are also charged in. The stirring speed is set at 350 rpm.

The temperature of the reaction mixture is raised to 69° C. within 30 minutes, which corresponds to a relative pressure of 11.5 bars.

After polymerization for 15 minutes at 69° C., the stirring speed is reduced to 150 rpm.

After polymerization for 2.25 hours at 69° C., the nonreacted gaseous vinyl chloride is released, and 440 g of polyvinyl chloride are collected.

EXAMPLE 3

The device and the polymerization conditions are the same as in Example 1, the difference being that the stirring speed is maintained at 500 rpm during the entire polymerization time.

After polymerization for three hours at 60° C. and release of the nonreacted gaseous vinyl chloride, 530 g of polyvinyl chloride are collected.

EXAMPLE 4

The device and the polymerization conditions are the same as in Example 1, the difference being that the initial stirring speed is set at 700 rpm instead of 500 rpm.

After polymerization for three hours at 60° C. and release of the nonreacted gaseous vinyl chloride, 525 g of polyvinyl chloride are collected.

EXAMPLE 5

After evacuation, 900 g of vinyl chloride are charged into a 1.5-liter upright stainless steel prepolymerizer with circular horizontal cross section equipped with a double jacket and an agitator formed by a "Lightnin"-type turbine with six flat blades with a diameter of 70 mm, and the device is purged by releasing 50 g of gaseous vinyl chloride. 0.216 g of ethyl hexyl peroxydicarbonate corresponding to 0.010 g of active oxygen and 0.1 g of vinyl acetate-crotonic acid copolymer are also charged in. The stirring speed is set at 1,200 rpm.

The temperature of the reaction mixture is raised to 69° C. within 30 minutes, which corresponds to a relative pressure of 11.5 bars.

After prepolymerization for 15 minutes at 69° C., when the degree of conversion is close to 10%, the prepolymer is transferred into a 2.5-liter upright polymerizer made from stainless steel and equipped with a double jacket, which was previously purged by releasing 50 g of gaseous vinyl chloride; this polymerizer contains 150 g of vinyl chloride and 0.432 g of ethyl hexyl peroxydicarbonate corresponding to 0.020 g of active oxygen. The polymerizer is equipped with an agitator formed by a ribbon wound in helical turns, passing by in the vicinity of the walls of the autoclave and is attached by three supports to a rotary shaft which passes through the upper part of the polymerizer along its axis and is rigidly attached at its lower end to an arm matching the shape of the convex bottom of the polymerizer. The stirring speed is set at 120 rpm.

The temperature of the reaction mixture is brought to 60° C. within 20 minutes, which corresponds to a relative pressure of 10 bars in the polymerizer.

After polymerization for three hours at 60° C. and release of the nonreacted gaseous vinyl chloride, 650 g of polyvinyl chloride are collected.

EXAMPLE 6

The device used is the same as in Example 5.

The prepolymerization conditions are the same as in Example 5, except for the fact that the stirring speed is set at 850 rpm and the amount of vinyl acetate-crotonic acid copolymer used is 0.02 g.

After prepolymerization for 15 minutes at 69° C., when the degree of conversion is close to 10%, the prepolymer is transferred into the polymerizer which was previously purged by releasing 50 g of gaseous vinyl chloride and contains 150 g of vinyl chloride, 0.216 g of ethyl hexyl peroxydicarbonate corresponding to 0.010 g of active oxygen and 0.249 g of lauroyl peroxide corresponding to 0.010 g of active oxygen. The stirring speed is set at 120 rpm.

The temperature of the reaction mixture is brought to 69° C. within 30 minutes, which corresponds to a relative pressure of 11.5 bars.

After polymerization for 2.25 hours at 60° C. and release of the nonreacted gaseous vinyl chloride, 510 g of polyvinyl chloride are collected.

EXAMPLE 7

After evacuation, 900 g of vinyl chloride are charged into the spherical reactor used in Example 1, which is used as a prepolymerizer, and the device is purged by releasing 50 g of gaseous vinyl chloride. 0.238 g of ethyl hexyl peroxydicarbonate corresponding to 0.011 g of active oxygen and 0.1 g of vinyl acetate-crotonic acid copolymer are also charged in. The stirring speed is set at 500 rpm.

The temperature of the reaction mixture is brought to 69° C. within 30 minutes, which corresponds to a relative pressure of 11.5 bars.

After prepolymerization for 15 minutes at 69° C., when the degree of conversion is close to 10%, the prepolymer is transferred into the upright polymerizer used in Example 5, which was previously purged by releasing 50 g of gaseous vinyl chloride and contains 150 g of vinyl chloride and 0.432 g of ethyl hexyl peroxydicarbonate corresponding to 0.020 g of active oxygen. The stirring speed is set at 120 rpm.

The temperature of the reaction mixture is brought to 60° C. within 20 minutes, which corresponds to a pressure of 10 bars in the polymerizer.

After polymerization for three hours at 60° C. and release of the nonreacted gaseous vinyl chloride, 630 g of polyvinyl chloride are collected.

EXAMPLE 8

The same prepolymerization conditions as in Example 5 are used in the prepolymerizer used in Example 5.

After prepolymerization for 15 minutes at 69° C., when the degree of conversion is close to 10%, the prepolymer is transferred into the spherical reactor used in Example 1, which is used as a polymerizer and was previously purged by releasing 50 g of gaseous vinyl chloride and contains 150 g of vinyl chloride and 0.432 g of ethyl hexyl peroxydicarbonate corresponding to 0.020 g of active oxygen. The stirring speed is set at 150 rpm.

The temperature of the reaction mixture is brought to 60° C. within 20 minutes, which corresponds to a relative pressure of 10 bars.

After polymerization for three hours at 60° C. and release of the nonreacted gaseous vinyl chloride, 660 g of polyvinyl chloride are collected.

EXAMPLE 9

After evacuation, 860 g of vinyl chloride are charged into the spherical reactor used in Example 1, and the device is purged by releasing 50 g of gaseous vinyl chloride. 15 g of vinyl acetate, 0.216 g of ethyl hexyl peroxydicarbonate corresponding to 0.010 g of active oxygen, 0.373 g of lauroyl peroxide corresponding to 0.015 g of active oxygen, and 0.015 g of vinyl acetate-crotonic acid copolymer are also charged in. The stirring speed is set at 350 rpm.

The temperature of the reaction mixture is brought to 69° C. within 30 minutes, which corresponds to a relative pressure of 11.5 bars.

After polymerization for 15 minutes at 69° C., the stirring speed is reduced to 150 rpm.

After polymerization for 2.5 hours at 69° C. and release of the nonreacted gaseous monomer, 415 g of a vinyl chloride-vinyl acetate copolymer consisting of 99 wt. % vinyl chloride and 1 wt. % vinyl acetate are collected.

EXAMPLE 10

The device used is the same as in Example 6.

The prepolymerization and polymerization conditions are the same as in Example 6, with the exception that 5 g of vinyl acetate are also charged into the prepolymerizer and 12 g of vinyl acetate are charged into the polymerizer.

After polymerization for 2.5-hours at 69° C. and release of the nonreacted gaseous monomers, 425 g of a vinyl chloride-vinyl acetate copolymer consisting of 99 wt. % vinyl chloride and 1% vinyl acetate are collected.

EXAMPLE 11

After evacuation, 44 kg of vinyl chloride are charged into a 70-liter horizontal cylindrical stainless-steel prepolymerizer with circular horizontal cross-section, equipped with a double jacket and an agitator formed by a "Lightnin"-type turbine having six flat blades with a diameter of 250 mm, and the device is purged by releasing 2 kg of gaseous vinyl chloride. 10.88 g of ethyl hexyl peroxydicarbonate corresponding to 0.504 g of active oxygen are also charged in. The stirring speed is set at 370 rpm.

The temperature of the reaction mixture is brought to 69° C. within 30 minutes, which corresponds to a relative pressure of 11.5 bars.

After prepolymerization for 15 minutes at 69° C., when the degree of conversion is close to 10%, the prepolymer is transferred into a spherical reactor as described above and shown in FIGS. 2 and 3, which has a capacity of 125 liters, is made of stainless steel and is equipped with a double jacket, where the distance between the blades of the agitator and the wall of the spherical zone of the polymerizer is between 2 mm and 15 mm, the said reactor having been previously purged by releasing 2 kg of gaseous vinyl chloride and containing 28 kg of vinyl chloride, 4.4 g of ethyl hexyl peroxydicarbonate corresponding to 0.665 g of active oxygen, 12.63 g of acetyl cyclohexanesulfonyl peroxide corresponding to 0.910 g of active oxygen, and 10.5 g of vinyl acetate-crotonic acid copolymer. The stirring speed is set at 75 rpm.

The temperature of the reaction mixture is brought to 54° C. within 20 minutes, which corresponds to a relative pressure of 7.8 bars in the polymerizer.

After polymerization for 3.5 hours at 54° C. and release of the nonreacted gaseous vinyl chloride at a temperature of 80° C. within two hours, 53.2 kg of polyvinyl chloride with a residual monomeric vinyl chloride content of 1 mg/kg are collected.

EXAMPLE 12

The same prepolymerization conditions as in Example 11 are used in the prepolymerizer used in Example 11.

After prepolymerization for 15 minutes at 69° C., when the degree of conversion is close to 10%, the prepolymer is transferred into the spherical reactor used in Example 11, used as a prepolymerizer, previously purged by releasing 2 kg of gaseous vinyl chloride and containing 28 kg of vinyl chloride, 14.4 g of ethyl hexyl peroxydicarbonate corresponding to 0.665 g of active oxygen, 12.63 g of acetyl cyclohexanesulfonyl peroxide corresponding to 0.910 g of active oxygen, and 10.5 g of vinyl acetate-crotonic acid copolymer. The stirring speed is set at 75 rpm.

The temperature of the reaction mixture is brought to 52° C. within 20 minutes, which corresponds to a relative pressure of 7.5 bars.

After polymerization for 1.25 hours at 52° C., the stirring speed is reduced to 30 rpm, and the temperature of the reaction mixture is brought to 55° C. within ten minutes, which corresponds to a relative pressure of 8 bars.

After polymerization for 1.25 hours at 55° C. and release of the nonreacted gaseous vinyl chloride, 53.8 kg of polyvinyl chloride are collected.

EXAMPLE 13

The same prepolymerization conditions as in Example 11 are used in the prepolymerizer used in Example 11.

After prepolymerization for 15 minutes at 69° C., when the degree of conversion is close to 10%, the prepolymer is transferred into the spherical reactor used in Example 11, used as a polymerizer, previously purged by releasing 2 kg of gaseous vinyl chloride and containing 36 kg of vinyl chloride, 16 g of ethyl hexyl peroxydicarbonate corresponding to 0.740 g of active oxygen, 14.08 g of acetyl cyclohexanesulfonyl peroxide corresponding to 1.015 g of active oxygen, and 11.7 g vinyl acetate-crotonic acid copolymer. The stirring speed is set at 75 rpm.

The temperature of the reaction mixture is brought to 52° C. within 20 minutes, which corresponds to a relative pressure of 7.5 bars.

After polymerization for 1.25 hours at 52° C., the stirring speed is reduced to 30 rpm, and the temperature of the reaction mixture is brought to 55° C. within ten minutes, which corresponds to a relative pressure of 8 bars.

After polymerization for 1.25 hours at 55° C. and release of the nonreacted gaseous vinyl chloride, 57.7 kg of polyvinyl chloride are collected.

EXAMPLE 14

The same prepolymerization conditions as in Example 11 are used in the prepolymerizer used in Example 11.

After prepolymerization for 15 minutes at 69° C., when the degree of conversion is close to 10%, the prepolymer is transferred into the spherical reactor used in Example 11, used as a polymerizer, previously purged by releasing 2 kg of gaseous vinyl chloride and containing 12 kg of vinyl chloride, 11.1 g of ethyl hexyl peroxydicarbonate corresponding to 0.513 g of active oxygen, 9.74 g of acetyl cyclohexanesulfonyl peroxide corresponding to 0.702 g of active oxygen, and 8.1 g of vinyl acetate-crotonic acid copolymer. The stirring speed is set at 75 rpm.

The temperature of the reaction mixture is brought to 52° C. within 20 minutes, which corresponds to a relative pressure of 7.5 bars.

After polymerization for 1.25 hours at 52° C., the stirring speed is reduced to 30 rpm, and the temperature of the reaction mixture is brought to 55° C. within ten minutes, which corresponds to a relative pressure of 8 bars.

After polymerization for 1.25 hours at 55° C. and release of the nonreacted gaseous vinyl chloride, 41.5 kg of polyvinyl chloride are collected.

EXAMPLE 15

The same prepolymerization conditions as in Example 11 are used in the prepolymerizer used in Example 11.

After prepolymerization for 15 minutes at 69° C., when the degree of conversion is close to 10%, the prepolymer is transferred into the spherical reactor used in Example 11, used as a polymerizer, previously purged by releasing 2 kg of gaseous vinyl chloride and containing 28 kg of vinyl chloride, 11.4 g of ethyl hexyl peroxydicarbonate corresponding to 0.665 g of active oxygen, 12.63 g of acetyl cyclohexanesulfonyl peroxide corresponding to 0.910 g of active oxygen, and 10.5 g of vinyl acetate-crotonic acid copolymer. The stirring speed is set at 100 rpm.

The temperature of the reaction mixture is brought to 54° C. within 20 minutes, which corresponds to a relative pressure of 7.8 bars, after which the stirring speed is gradually reduced to 30 rpm within two hours.

After polymerization for 3.5 hours at 54° C. and release of the nonreacted gaseous vinyl chloride, 54.3 kg of polyvinyl chloride are collected.

EXAMPLE 16

After evacuation, 130 kg of vinyl chloride are charged into a 200-liter upright cylindrical stainless-steel prepolymerizer with circular horizontal cross section, which is equipped with a double jacket and a "Lightnin"-type turbine having six flat blades with a diameter of 290 mm, and the device is purged by releasing 10 kg of gaseous vinyl chloride. 31.1 g of ethyl hexyl peroxydicarbonate corresponding to 1.44 g of active oxygen are also charged in. The stirring speed is set at 300 rpm.

The temperature of the reaction mixture is brought to 69° C. within 30 minutes, which corresponds to a relative pressure of 11.5 bars.

After prepolymerization for 15 minutes at 69° C., when the degree of conversion is close to 10%, the prepolymer is transferred into a 400-liter upright stainless-steel polymerizer equipped with a double jacket, which was previously purged by releasing 10 kg of gaseous vinyl chloride and contains 95 kg of vinyl chloride, 44.1 g of ethyl hexyl peroxydicarbonate corresponding to 2.039 g of active oxygen, 38.72 g of acetyl cyclohexanesulfonyl peroxide corresponding to 2.79 g of active oxygen, and 25 g of vinyl acetate-crotonic acid copolymer. The polymerizer is equipped with two agitators with independent drives, one of them, designated by A, being formed by a ribbon wound in helical coils around a rotary shaft extending from the upper part of the said polymerizer along its axis, while the other, designated by B, is formed by two arms matching the shape of the convex bottom and connected to a spindle passing through said bottom of the polymerizer along its axis. The stirring speed of agitator A is set at 35 rpm, and that of agitator B, which rotates in the opposite direction, is set at 25 rpm.

The temperature of the reaction mixture is brought to 54° C. within 20 minutes, which corresponds to a relative pressure of 7.8 bars in the polymerizer.

After polymerization for 3.5 hours at 54° C. and releasing the nonreacted gaseous vinyl chloride at a temperature of 80° C. within 2.75 hours, 160.8 kg of polyvinyl chloride with a residual monomeric vinyl chloride content of 2 mg/kg are collected.

EXAMPLE 17

The same prepolymerization conditions which were used in Example 11 are used in the prepolymerizer used in Example 11, with the difference that the stirring speed is set at 485 rpm instead of 370 rpm.

After prepolymerization for 15 minutes at 69° C., when the degree of conversion is close to 10%, the prepolymer is transferred into the spherical reactor used in Example 11, used as a polymerizer, previously purged by releasing 2 kg of gaseous vinyl chloride and containing 28 kg of vinyl chloride, 17.4 g of ethyl hexyl peroxydicarbonate corresponding to 0.805 g of active oxygen, 7.84 g of lauroyl peroxide corrresponding to 0.315 g of active oxygen and 2.40 g of vinyl acetate-crotonic acid copolymer The stirring speed is set at 75 rpm.

The temperature of the reaction mixture is brought to 57° C. within 30 minutes, which corresponds to a relative pressure of 8.2 bars, and it is then brought to 71° C. within 1.75 hours, which corresponds to a relative pressure of 12 bars.

After polymerization for one hour at 71° C., the stirring speed is reduced to 30 rpm.

After polymerization for 20 minutes at a stirring speed of 30 rpm and release of the nonreacted gaseous vinyl chloride, 42.7 kg of polyvinyl chloride are collected.

EXAMPLE 18

After evacuation, 52.5 kg of vinyl chloride are charged into the prepolymerizer used in Example 11, and the device is purged by releasing 3 kg of gaseous vinyl chloride. 13.6 g of ethyl hexyl peroxydicarbonate corresponding to 0.629 g of active oxygen are also charged in. The stirring speed is set at 485 rpm.

The temperature of the reaction mixture is brought to 69° C. within 30 minutes, which corresponds to a relative pressure of 11.5 bars.

After prepolymerization for 15 minutes at 69° C., when the degree of conversion is close to 10%, the prepolymer is transferred into the spherical reactor used in Example 11, used as a polymerizer, previously purged by releasing 3 kg of gaseous vinyl chloride and containing 34.5 kg of vinyl chloride, 20.9 g of ethyl hexyl peroxydicarbonate corresponding to 0.966 g of active oxygen, 9.41 g of lauroyl peroxide corresponding to 0.378 g of active oxygen, and 2.9 g of vinyl acetate-crotonic acid copolymer. The stirring speed is set at 75 rpm.

The temperature of the reaction mixture is brought to 57° C. within 30 minutes, which corresponds to a relative pressure of 8.7 bars in the polymerizer, and then it is brought to 71° C. within 1.75 hours, which corresponds to a relative pressure of 12 bars.

After polymerization for one hour at 71° C., the stirring speed is reduced to 30 rpm.

After polymerization for 20 minutes at a stirring speed of 30 rpm and release of the nonreacted gaseous vinyl chloride, 51.6 kg of polyvinyl chloride are collected.

EXAMPLE 19

The same prepolymerization conditions which were used in Example 16 are used in the prepolymerizer used in Example 16, with the difference that the stirring speed is set at 390 rpm instead of 300 rpm.

After prepolymerization for 15 minutes at 69° C., when the degree of conversion is close to 10%, the prepolymer is transferred into the upright polymerizer used in Example 16, which was previously purged by releasing 10 kg of gaseous vinyl chloride and contains 90 kg of vinyl chloride, 52.16 g of ethyl hexyl peroxydicarbonate corresponding to 2.412 g of active oxygen, 23.5 g of lauroyl peroxide corresponding to 0.945 g of active oxygen, and 7.2 g of vinyl acetate-crotonic acid copolymer. The stirring speed of agitator A is set at 30 rpm and that of agitator B, rotating in the opposite sense, is set at 20 rpm.

The temperature of the reaction mixture is brought to 57° C. within 30 minutes, which corresponds to a relative pressure of 8.2 bars, and then it is brought to 71° C. within 1.75 hours, which corresponds to a relative pressure of 12 bars.

After polymerization for 20 minutes at 71° C. and release of the nonreacted gaseous vinyl chloride, 124 kg of polyvinyl chloride are collected.

EXAMPLE 20

The same prepolymerization conditions which were used in Example 11 are used in the prepolymerizer used in Example 11, with the difference that the stirring speed is set at 420 rpm instead of 370 rpm.

After prepolymerization for 15 minutes at 69° C., when the degree of conversion is close to 10%, the prepolymer is transferred into the spherical reactor used in Example 11, used as a polymerizer, previously purged by releasing 2 kg of gaseous vinyl chloride and containing 28 kg of vinyl chloride, 8.32 g of ethyl hexyl peroxydicarbonate corresponding to 0.385 g of active oxygen, 17 g of acetyl cyclohexanesulfonyl peroxide corresponding to 1.225 g of active oxygen and 13 g of vinyl acetate-crotonic acid copolymer. The stirring speed is set at 75 rpm.

The temperature of the reaction mixture is brought to 53° C. within 30 minutes, which corresponds to a relative pressure of 7.3 bars.

After polymerization for 1.25 hours at 53° C., the stirring speed is reduced to 30 rpm, and the temperature of the reaction mixture is reduced to 47° C. within 45 minutes, which corresponds to a relative pressure of 6.2 bars.

After polymerization for 1.5 hours at 47° C. and releasing the nonreacted gaseous vinyl chloride, 45.5 kg of polyvinyl chloride are collected.

EXAMPLE 21

The same prepolymerization conditions which were used in Example 18 are used in the prepolymerizer used in Example 18, with the difference that the stirring speed is set at 420 rpm instead of 485 rpm.

After prepolymerization for 15 minutes at 69° C., when the degree of conversion is close to 10%, the prepolymer is transferred into the spherical reactor used in Example 11, used as a polymerizer, previously purged by releasing 2 kg of gaseous vinyl chloride and containing 34.5 kg of vinyl chloride, 9.88 g of ethyl hexyl peroxydicarbonate corresponding to 0.462 g of active oxygen, 20.4 g of acetyl cyclohexanesulfonyl peroxide corresponding to 1.47 g of active oxygen, and 16 g of vinyl acetate-crotonic acid copolymer. The stirring speed is set at 75 rpm.

The temperature of the reaction mixture is brought to 53° C. within 30 minutes, which corresponds to a relative pressure of 7.3 bars.

After polymerization for 1.25 hours, when the degree of conversion is close to 10%, the stirring speed is reduced to 50 rpm, and the temperature of the reaction mixture is reduced to 47° C. within 45 minutes, which corresponds to a relative pressure of 6.2 bars.

After polymerization for 1.5 hours at 47° C. and release of the nonreacted gaseous vinyl chloride, 51.9 kg of polyvinyl chloride are collected.

EXAMPLE 22

The same prepolymerization conditions as in Example 16 are used in the prepolymerizer used in Example 16, with the difference that the stirring speed is set at 350 rpm instead of 300 rpm.

After prepolymerization for 15 minutes at 69° C., when the degree of conversion is close to 10%, the prepolymer is transferred into the upright polymerizer used in Example 16, which was previously purged by releasing 10 kg of gaseous vinyl chloride and contains 90 kg of vinyl chloride, 25 g of ethyl hexyl peroxydicarbonate corresponding to 1.16 g of active oxygen, 51.08 g of acetyl cyclohexanesulfonyl peroxide corresponding to 3.68 g of active oxygen, and 31 g of vinyl acetate-crotonic acid copolymer. The stirring speed of agitator A is set at 30 rpm, and that of agitator B, which rotated in the opposite direction, is set at 20 rpm.

The temperature of the reaction mixture is brought to 53° C. within 30 minutes, which corresponds to a relative pressure of 7.3 bars.

After polymerization for 1.25 hours at 53° C., the temperature of the reaction mixture is reduced to 47° C. within 45 minutes, which corresponds to a relative pressure of 6.2 bars.

After polymerization for 1.5 hours at 47° and release of the nonreacted gaseous vinyl chloride, 127.5 kg of polyvinyl chloride are collected.

EXAMPLE 23

After evacuation, 66 kg of vinyl chloride are charged into the spherical reactor used in Example 11, and the device is purged by releasing 6 kg of gaseous vinyl chloride. 15.5 g of ethyl hexyl peroxydicarbonate corresponding to 0.717 g of active oxygen and 12 g of vinyl acetate-crotonic acid copolymer are also charged in. The stirring speed is set at 175 rpm.

The temperature of the reaction mixture is brought to 69° C. within 40 minutes, which corresponds to a relative pressure of 11.5 bars.

After polymerization for 15 minutes at 69° C., the temperature of the reaction medium is reduced to 25° C. within ten minutes, which corresponds to a relative pressure of 3.5 bars. 15 kg of vinyl chloride, 11.2 g of ethyl hexyl peroxydicarbonate corresponding to 0.518 g of active oxygen, and 13.5 g of acetyl cyclohexanesulfonyl peroxide corresponding to 0.973 g of active oxygen are now charged in. The stirring speed is set at 75 rpm.

The temperature of the reaction mixture is brought to 57° C. within 20 minutes, which corresponds to a relative pressure of 8.2 bars.

After polymerization for 1.25 hours at 57° C., the stirring speed is reduced to 50 rpm.

After polymerization for 3.5 hours at 57° C. and release of the nonreacted gaseous vinyl chloride, 58.2 kg of polyvinyl chloride are collected.

EXAMPLE 24

After evacuation, 66 kg of vinyl chloride are charged into the spherical reactor used in example 11, and the device is purged by releasing 6 kg of gaseous vinyl chloride. 15.5 g of ethyl hexyl peroxydicarbonate corresponding to 0.717 g of active oxygen and 3 g of vinyl acetate-crotonic acid copolymer are also charged in. The stirring speed is set at 175 rpm.

The temperature of the reaction mixture is brought to 69° C. within 40 minutes, which corresponds to a relative pressure of 11.5 bars.

After polymerization for 15 minutes at 69° C., the temperature of the reaction mixture is reduced to 25° C. within ten minutes, which corresponds to a relative pressure of 3.5 bars. 15 kg of vinyl chloride, 14.6 g of ethyl hexyl peroxydicarbonate corresponding to 0.675 g of active oxygen, and 8.4 g of lauroyl peroxide corresponding to 0.338 g of active oxygen are now charged in. The stirring speed is set at 75 rpm.

The temperature of the reaction medium is brought to 57° C. within 30 minutes, which corresponds to a relative pressure of 8.2 bars, and then it is brought to 71° C. within 1.75 hours, which corresponds to a relative pressure of 12 bars.

After polymerization for 2.25 hours at a stirring speed of 75 rpm, the stirring speed is reduced to 50 rpm.

After polymerization for 20 minutes at a stirring speed of 50 rpm and release of the nonreacted gaseous vinyl chloride, 46.5 kg of polyvinyl chloride are collected.

EXAMPLE 25

After evacuation, 66 kg of vinyl chloride are charged into the spherical reactor used in example 11, and the device is purged by releasing 6 kg of gaseous vinyl chloride. 15 g of ethyl hexyl peroxydicarbonate corresponding to 0.717 g of active oxygen and 24 g of vinyl acetate-crotonic acid copolymer are also charged in. The stirring speed is set at 175 rpm.

The temperature of the reaction mixture is brought to 69° C. within 40 minutes, which corresponds to a relative pressure of 11.5 bars.

After polymerization for 15 minutes at 69° C., the temperature of the reaction mixture is reduced to 25° C. within ten minutes, which corresponds to a relative pressure of 3.5 bars. 15 kg of vinyl chloride, 6.3 g of ethyl hexyl peroxydicarbonate corresponding to 0.291 g of active oxygen, and 19.7 g of acetyl cyclohexanesulfonyl peroxide corresponding to 1.420 g of active oxygen are now charged in. The stirring speed is set at 75 rpm.

The temperature of the reaction mixture is brought to 53° C. within 40 minutes, which corresponds to a relative pressure of 7.3 bars.

After polymerization for 1.25 hours at 53° C., the stirring speed is reduced to 50 rpm, and the temperature of the reaction mixture is brought to 47° C. within 45 minutes, which corresponds to a relative pressure of 6.2 bars.

After polymerization for 1.5 hours at 47° C. and release of the nonreacted gaseous vinyl chloride, 50.6 kg of polyvinyl chloride are collected.

EXAMPLE 26

After evacuation, 82 kg of vinyl chloride are charged into the spherical reactor used in Example 11, and the device is urged by releasing 7 kg of gaseous vinyl chloride. 19.4 g of ethyl hexyl peroxydicarbonate corresponding to 0.897 g of active oxygen and 15 g of vinyl acetate-crotonic acid copolymer are also charged in. The stirring speed is set at 175 rpm.

The temperature of the reaction mixture is brought to 69° C. within 40 minutes, which corresponds to a relative pressure of 11.5 bars.

After polymerization for 15 minutes at 69° C., the temperature of the reaction mixture is reduced to 57° C. within ten minutes, which corresponds to a relative pressure of 8.2 bars. 11.2 g of ethyl hexyl peroxydicarbonate corresponding to 0.518 g of active oxygen and 13.5 g of acetyl cyclohexanesulfonyl peroxide corresponding to 0.973 g of active oxygen are not charged in. The stirring speed is set at 75 rpm.

After polymerization for 1.25 hours at 57° C., the stirring speed is reduced to 50 rpm.

After polymerization for 3.5 hours at 57° C. and release of the nonreacted gaseous vinyl chloride, 56 kg of polyvinyl chloride are collected.

Tables I, II, and III below indicate the weight percentages of the noble product for each example, as well as the following characteristics:
(i) viscosity index,
(ii) apparent density,
(iii) mean particle diameter, and
(iv) weight percentage of the fine particles, determined for the noble product

TABLE I

| | EXAMPLES ACCORDING TO THE PRESENT INVENTION | | | | COMPARATIVE EXAMPLES | | EXAMPLES ACCORDING TO THE PRESENT INVENTION | | | COMPARATIVE EXAMPLE |
|---|---|---|---|---|---|---|---|---|---|---|
| | 1 | 2 | 3 | 4 | 5 | 6 | 7 | 8 | 9 | 10 |
| Weight percentage of noble product | 90.4 | 82.7 | 92.0 | 87.6 | 81.5 | 75.5 | 78.2 | 80.6 | 86.3 | 77.4 |
| Viscosity index (ml/g) | 90 | 80 | 89 | 91 | 88 | 79 | 91 | 89 | 75 | 74 |
| Apparent density (kg/m$^3$) | 560 | 540 | 550 | 545 | 560 | 565 | 545 | 565 | 585 | 575 |
| Mean particle diameter ($\mu$m) | 127 | 98 | 123 | 105 | 133 | 97 | 122 | 128 | 99 | 101 |
| Weight percentage of fine particles (%) | 2.6 | 0.8 | 2.1 | 1.2 | 4.5 | 6.3 | 4.9 | 5.6 | 1.9 | 5.2 |

TABLE II

| | EXAMPLES ACCORDING TO THE PRESENT INVENTION | | | | | COMPARATIVE EXAMPLE | EXAMPLES ACCORDING TO THE PRESENT INVENTION | | COMPARATIVE EXAMPLE | EXAMPLES ACCORDING TO THE PRESENT INVENTION | | COMPARATIVE EXAMPLE |
|---|---|---|---|---|---|---|---|---|---|---|---|---|
| | 11 | 12 | 13 | 14 | 15 | 16 | 17 | 18 | 19 | 20 | 21 | 22 |
| Weight percentage of noble product | 97.3 | 98.4 | 97.4 | 97.5 | 97.7 | 96.3 | 98.4 | 97.6 | 96.5 | 99.1 | 97.8 | 96.1 |
| Viscosity index (ml/g) | 111 | 111 | 111 | 110 | 110 | 110 | 81 | 80 | 80 | 122 | 129 | 127 |
| Apparent density (kg/m$^3$) | 580 | 590 | 600 | 610 | 590 | 590 | 600 | 560 | 610 | 560 | 560 | 550 |
| Mean particle diameter (m) | 133 | 151 | 144 | 138 | 142 | 137 | 109 | 99 | 103 | 123 | 133 | 125 |
| Weight percentage of fine particles (%) | 1.8 | 1.3 | 1.5 | 1.2 | 1.7 | 2.6 | 2.7 | 2.5 | 3.5 | 0.8 | 1.1 | 1.5 |

TABLE III

|  | EXAMPLES ACCORDING TO THE PRESENT INVENTION | | | |
| --- | --- | --- | --- | --- |
|  | 23 | 24 | 25 | 26 |
| Weight percentage of noble product (%) | 97.4 | 97.5 | 97.9 | 98.2 |
| Viscosity index (m/lg) | 111 | 81 | 128 | 110 |
| Apparent density (kg/m$^3$) | 600 | 600 | 530 | 600 |
| Mean particle diameter (m) | 134 | 93 | 125 | 129 |
| Weight percentage of fine particles (%) | 0.9 | 1.7 | 0.9 | 0.8 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for preparing polymers and copolymers based on vinyl chloride by mass polymerization of a monomer composition based on vinyl chloride, comprising carrying out at least part of the polymerization reaction in a polymerization zone defined by a sphere having a spherical wall by effecting in the said polymerization zone a controlled and regulated circulation of the polymerization reaction mixture by means of a rotated blade-type turbine assembly, where the said blades pass by in the vicinity of the said wall over 10% to 60% of its surface, the reaction mixture being caused by the centrifugal force of said rotated blade-type turbine assembly to perform an at least partially ascending movement over at least part of the spherical wall and falling back, essentially under the action of gravity in the central part of the spherical polymerization zone, thus ensuring intensive mixing without dead space.

2. The process of claim 1, wherein the entire polymerization reaction is carried out in the polymerization zone.

3. The process of claim 1, wherein the polymerization reaction is carried out in two steps which are carried out in different reaction devices with a prepolymerization operation with a monomer composition based on vinyl chloride in the first step and a final polymerization operation in the second step; the first step being carried out in a polymerization zone defined by an a sphere having a wall.

4. The process of claim 3, wherein the prepolymerization operation is carried out in the polymerization zone defined by a sphere having a spherical wall until the degree of conversion of the monomer composition reaches 3% to 15%, a supplementary monomer composition based on vinyl chloride, which is identical to or different from that used during the first step, is added to the reaction mixture if needed, after which the final polymerization operation is carried out with the reaction mixture thus formed with agitation slower than that used in the prepolymerization.

5. The process of claim 1, wherein the polymerization reaction is carried out in two steps which are carried out in different devices with a prepolymerization operation with a monomer composition based on vinyl chloride carried out in the first step and a final polymerization operation in a polymerization zone defined by a sphere having a spherical wall is carried out in the second step.

6. The process of claim 5, wherein the prepolymerization operation is carried out with intensive turbulizing agitation until the degree of conversion of the monomer composition reaches 3% to 15%, a supplementary monomer composition based on vinyl chloride, which is identical to or different from that used in the first step, is added to the reaction mixture if needed, after which the final polymerization operation is carried out with the reaction mixture thus formed in the polymerization zone defined by a sphere having a spherical wall.

* * * * *

UNITED STATES PATENT AND TRADEMARK OFFICE
CERTIFICATE OF CORRECTION

PATENT NO. : 4,868,255
DATED : September 19, 1989
INVENTOR(S) : Chatelain, et al It is certified that error appears in the above-identified patent and that said Letters Patent is hereby corrected as shown below:

Column 2, line 40, after "89,025", insert before "1,436,744", -- No. --,
line 41, after "87 626", and before "1,450,464", insert -- No. --.

Column 3, line 66, delete "o" and insert "of".

Column 5, line 20, after "assembly." a new paragraph should appear.
line 32, after "No." and before "1 22425" insert -- 8 --,
line 54, "assembly $T_1$" should read -- assembly $T_2$ --.

Column 6, line 20, delete "b" and substitute therefor -- by --,
lines 50, 51, 52, and 53 the word "tert-butyl" should be typed -- <u>tert</u>-butyl --.

Column 10, line 39, after the comma and before "4.4" insert -- 1 --, so as to read -- 14.4 g --.

Column 15, line 23, delete "rotated" and substitute therefor -- rotates --,

Columns 19 and 21, in the line entitled "Mean particle diameter" insert after the parenthesis and before "m" the following -- $\mu$ --.

UNITED STATES PATENT AND TRADEMARK OFFICE
CERTIFICATE OF CORRECTION

PATENT NO. : 4,868,255

DATED : September 19, 1989

INVENTOR(S) : Chatelain, et al

It is certified that error appears in the above-identified patent and that said Letters Patent is hereby corrected as shown below:

Column 22, line 12, delete the word "an".

Signed and Sealed this

Eighteenth Day of September, 1990

Attest:

HARRY F. MANBECK, JR.

*Attesting Officer*         *Commissioner of Patents and Trademarks*